UNITED STATES PATENT OFFICE.

THOMAS FIRTH, OF CINCINNATI, OHIO.

IMPROVEMENT IN ALLOYS FOR JOURNAL-BOXES.

Specification forming part of Letters Patent No. 12,788, dated May 1, 1855.

*To all whom it may concern:*

Be it known that I, THOMAS FIRTH, of the city of Cincinnati, county of Hamilton, in the State of Ohio, have invented a new and useful composition of metals for the use of all kinds of journals and other rubbing surfaces to friction upon; and I do hereby declare that the following is a full and exact description of the same.

The nature of my invention and discovery consists of a composition of metals made of copper and zinc, the exact proportions of which are seven and one-half pounds of copper to ninety-two and one-half pounds of zinc—equal one hundred of the composition.

In my researches my object has been to produce a composition of metals which should be free from the objections made to those in use for similar purposes—such as cutting and melting in the journals of rolling-mills and boxes of car-wheels, as well as in the packing of steam-cylinders, &c.—and at the same time to reduce the cost to the consumer, in all of which my practical experiments have been crowned with success.

The composition requires a red heat to fuse it, and according to the calculated scale of Fahrenheit requires about eight hundred degrees of heat.

To mix the metals first melt in a crucible seven and one-half pounds of the best clean copper. Then add the zinc in small quantities, and keep stirring the mixture until ninety-two and a half pounds have been mixed with the copper, at which time it is ready to be introduced into the mold. Less than a pound of copper and more or less than two pounds of zinc variation from the above composition would essentially injure the composition.

What I claim, and desire to secure by Letters Patent, is—

A composition of matter of copper and zinc in the proportion of seven and one-half parts of copper to ninety-two and a half parts of zinc, or any other mixture substantially the same, and which will produce the intended effect.

THOMAS FIRTH.

Witnesses:
JACOB H. GETZENDANNER,
G. A. SHADDINGER.